Dec. 8, 1964          A. G. KELLY          3,160,288
       METHOD AND APPARATUS FOR RECOVERING
               AND SALVAGING CRASHED AIRCRAFT
Filed Nov. 23, 1962                      6 Sheets-Sheet 1

INVENTOR.
ALBERT G. KELLY
BY
*Hansen and Lane*
HIS ATTORNEYS

FIG_4

FIG_5

INVENTOR.
ALBERT G. KELLY
BY
Hansen and Lane
HIS ATTORNEYS

Dec. 8, 1964 A. G. KELLY 3,160,288
METHOD AND APPARATUS FOR RECOVERING
AND SALVAGING CRASHED AIRCRAFT
Filed Nov. 23, 1962

INVENTOR.
ALBERT G. KELLY
BY
Hansen and Lane
HIS ATTORNEYS

United States Patent Office 3,160,288
Patented Dec. 8, 1964

3,160,288
METHOD AND APPARATUS FOR RECOVERING
AND SALVAGING CRASHED AIRCRAFT
Albert G. Kelly, 15812 Alta Vista Way, San Jose, Calif.
Filed Nov. 23, 1962, Ser. No. 239,448
10 Claims. (Cl. 214—1)

This invention relates to a method for handling a damaged airplane and to apparatus employed in such method.

The present method and apparatus was devised to simplify the problem of removing and salvaging aircraft disabled on take-off, approach and landing thereof on the airstrips of air terminals and adjacent areas. Airlines who own and operate scheduled aircraft are charged for landing and take-off facilities. These airlines usually have hangers, ticket and baggage handling quarters at major airports. Whenever an aircraft is disabled on the runways of such airports a charge is made for the non-use of such airstrip due to the damaged aircraft obstructing its use. As a result of such demurrage and the expediency of getting a damaged plane out of the way quickly, considerable secondary damage to the craft has heretofore been experienced beyond that entailed by the crash. Such secondary damage is caused by the awkward conditions and medium of handling the irregular shaped craft. The method known prior to this application has entailed the use of forty or more men. The equipment used under the prior method would be cribbing built up under inflatable air bags at various positions under the wings by the men using jack screws and levers to raise the craft sufficiently for placement on flat bed carriers. Used tire carcasses are placed on these flat beds for cushioning the aircraft carried thereby. Such procedure is fraught with the danger of further damage to the wings and fuselage, especially to the thin metal skin thereof. Moreover, the air bags as well as stacked tire carcasses lack lateral stability allowing the airplane to shift position with the possibility of further damage to the frame or skin of the damaged craft.

The present invention has as an object the alleviation of the foregoing deficiencies. It contemplates the provision of a method and means requiring about eight men for recovering a damaged aircraft. It includes novel means for supporting the craft at critical jack points and adjacent areas which are constructed into aircraft to receive and uniformly distribute the load without further or secondary damage to the craft.

It is another object of the present invention to provide a method and means for safely removing an aircraft from a runway within a minimum of time to thereby minimize the use of airport facilities following a crash.

It is a further object of this invention to provide lifting beams at or near the jacking points of an aircraft and a novel rocking beam between each lifting beam and the wing structure to be supported thereby to provide self leveling support irrespective of a differential of lift between the opposite ends of the lifting beams.

It is another object to provide an A frame coordinated with all three jack points of an aircraft for tying together support means at such points to thereby minimize racking of the craft supported thereby.

It is a still further object of the present invention to provide a novel arrangement for supporting a disabled aircraft in a balanced condition for mobility.

These and other objects and advantages of the present invention will become apparent from a reading of the following description and claims in the light of the drawings in which:

Figure 4:
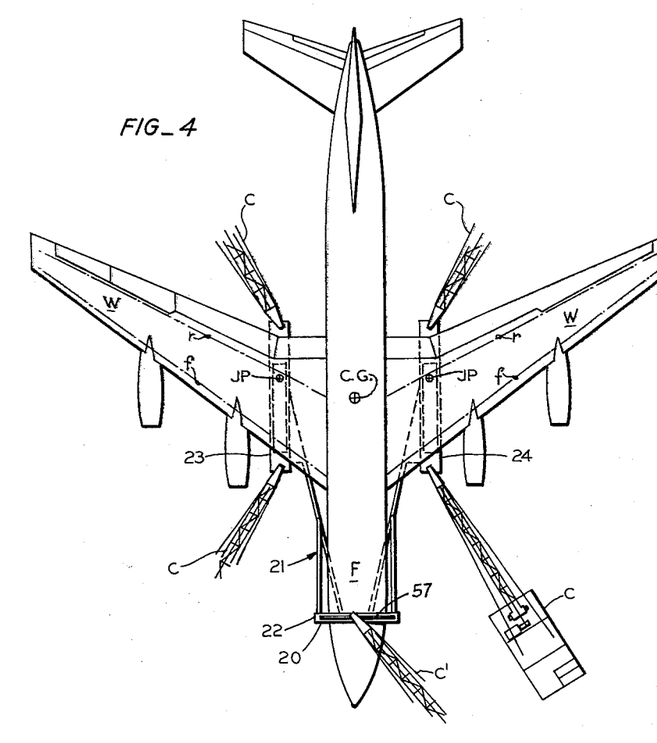
FIG. 4 is a plan view of the aircraft of FIGS. 1, 2 and 3 and the procedure therein illustrated.

Referring to FIG. 4 an aircraft A is shown in plan. The particular aircraft shown is of the Douglas aircraft design commonly known as the DC-8 Jet Mainliner. While the description is specific, by way of example, to the particular aircraft shown it will be appreciated that procedurally, and apparatus-wise, the same steps and equipment are equally applicable to aircraft of other designs such as the Boeing 707 jet liner and others.

In most present day heavier than air aircraft there is constructed into the framework thereof certain bearing points, designated as jack points $jp$ where pressure from beneath may be exerted to lift the aircraft without damaging the skin or the thin outer metallic covering of the wings W and/or the fuselage F. The main jack points are disposed, one beneath each wing and one at the nose of the main body or fuselage F of the airplane. A jack point at the tail section of the fuselage may be used in the initial lifting operation depending upon the location of the center of graviy C.G. of the entire craft relative to the location of the lifting apparatus under the wings.

In general the apparatus of the present invention for removing disabled aircraft is designated 20 in the drawings. Broadly the removal apparatus 20 comprises a three point support for an aircraft coordinated with the jack points $jp$ of the craft to assure firm and stable support of a disabled craft during emergency movement thereof.

Figure 7:
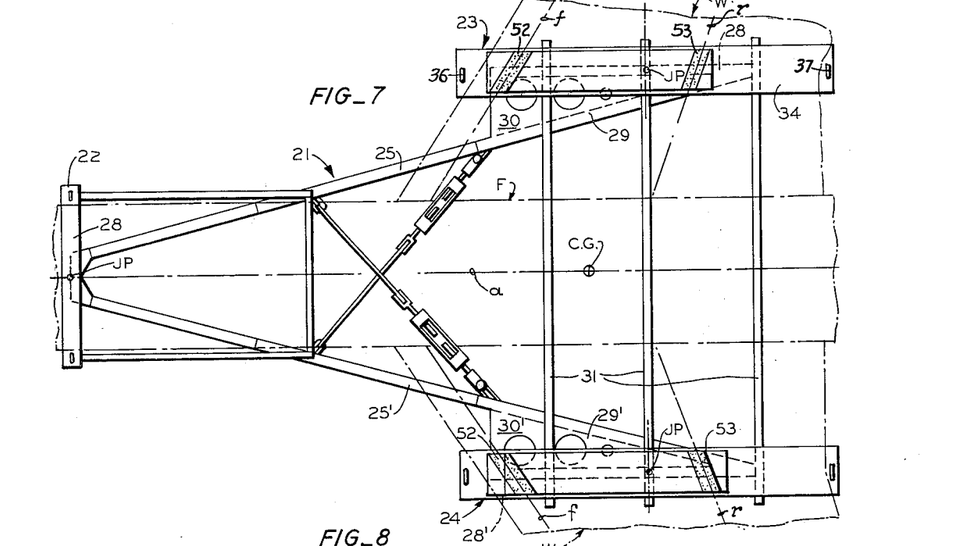
FIG. 7 is a fragmentary enlargement of the plan view of FIG. 4 with the aircraft in phantom and at 90° clockwise thereof, FIG. 7 illustrating the removal apparatus for supporting the disabled craft for movement.

More specifically the removal apparatus 20 includes an A frame 21 which is of substantially triangular shape in plan (FIGS. 4 and 7). The A frame has its altitudinal axis $a$ adapted to be disposed parallel to and below the longitudinal axis $l$ of the fuselage F of the aircraft A and the base limits of such triangular frame spans the aircraft aft of its center of gravity C.G.

The A frame 21 has a yoke 22 at its apex end adapted to receive and support the fuselage or main body F of an aircraft A. Each base angle of the frame 21 is constructed to hold wing supporting means 23 and 24 parallel to each other equidistant from the long axis $a$ of the A frame (FIG. 7). These wing supporting means are beams spaced from each other such as to be disposed one beneath each jack point $jp$ of the respective wing. The yoke 22 is so disposed as to be located at the jack point of the main body or fuselage F of the aircraft A. In this manner a three point support for the entire aircraft is accomplished during raising and transporting of a disabled aircraft.

Figure 8:
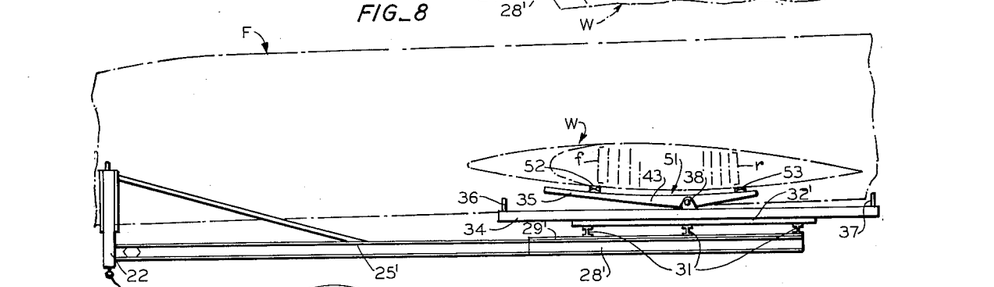
FIG. 8 is a side elevational view of FIG. 7.
Figures 13, 14, 15:
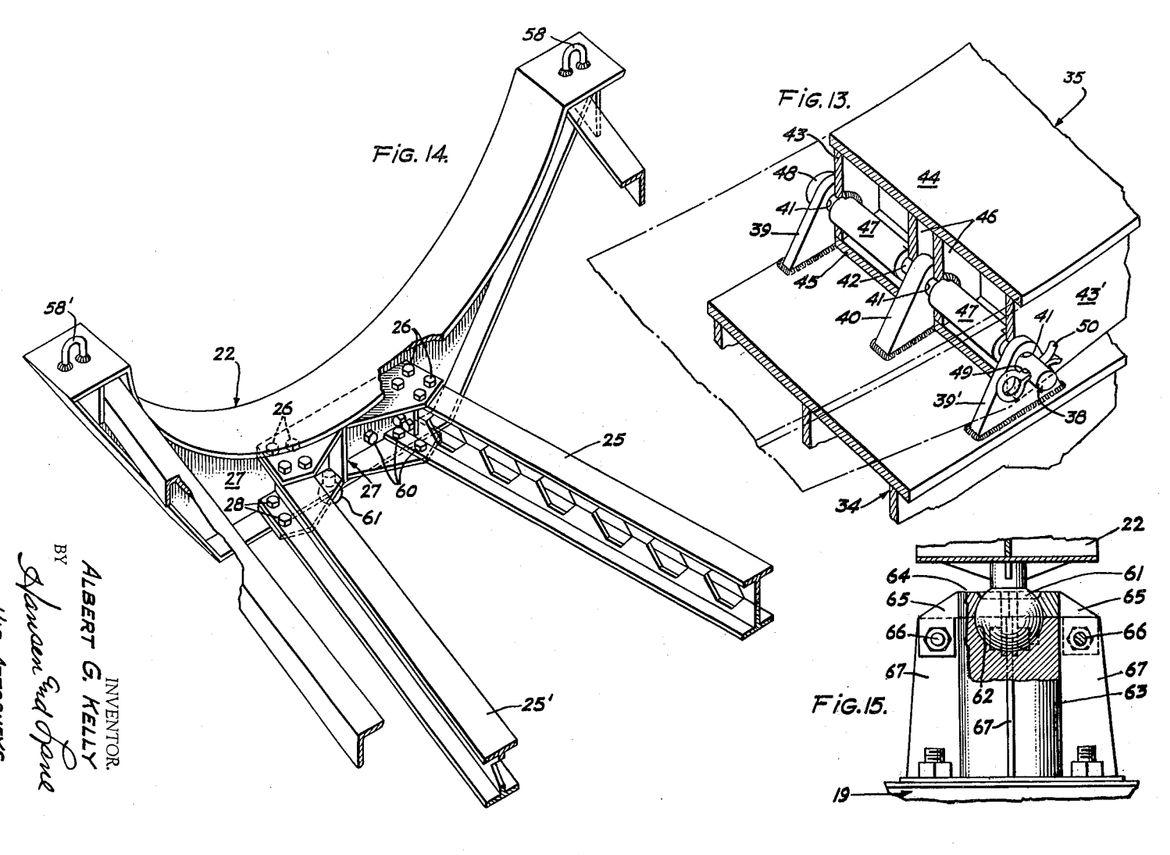
FIG. 13 is an enlarged fragmentary perspective view of the detail of FIG. 11.
FIG. 14 is a fragmentary perspective view of a nose and/or tail yoke forming a part of the apparatus shown in FIGS. 6, 7 and 8.
FIG. 15 is a front elevation, partially in section of a ball and socket mount embodied in the apparatus.

The A frame 21 is built of structural steel and includes a pair of diverging I beams 25 and 25' having their fore-ends secured by bolts 26 or the like to an end box 27 of structural steel fabrication (FIG. 14). The aft end of each I beam (FIGS. 7 and 8) have shorter I beams 28 and 28', respectively, secured thereto at their outer sides and extending forwardly therefrom substantially parallel to each other and to the axis $a$ of the A frame 21. A gusset plate 29 is secured to the upper flanges of the I beams 25 and 28 and a similar gusset plate 29' is secured to the upper flanges of the I beams 25' and 28'. Thus it will be seen that a wing supporting platform 30–30' is provided outside the base angles of the A frame 21 in the region of the jack points of the respective wings of an aircraft to be supported thereby.

A plurality of cross beams 31 are provided to span the base end of the otherwise open ended A frame. These cross beams 31, which are structural steel I beams, rest upon the platforms 30–30' and are secured thereto to tie the wing supporting platforms together in fixed relation to the craft to be supported. Block beams of wood are placed transverse to the cross beams 31, one or more 32 above the platform 30 and one or more 32' above the platform 30'. These block beams 32–32' are disposed parallel to each other and to the long axis $a$ of the A frame 21. The block beams 32–32' are placed beneath the wing jack points $jp$ of the particular aircraft to be supported and may, if necessary be secured to the several cross beams 31.

Referring now the wing supporting beams 23 and 24, each is of identical construction and like reference numerals will indicate like parts thereof. Each wing supporting beam 23–24 comprises a lifting beam 34 and a pivoted beam 35.

The lifting beam 34 is a box girder especially constructed of structural steel and of a length sufficient to projecting beyond the fore and aft edges of the section of the wing at jack point. This box girder has a flat top and bottom and has U-bolt eyes 36 and 37 projecting upwardly therefrom at each end of the beam 34. The pivot beam 35 is pivotally mounted as at 38 upon the top of the lifting beam substantially midway the ends thereof.

Figures 10, 11, 12, 19, 20:
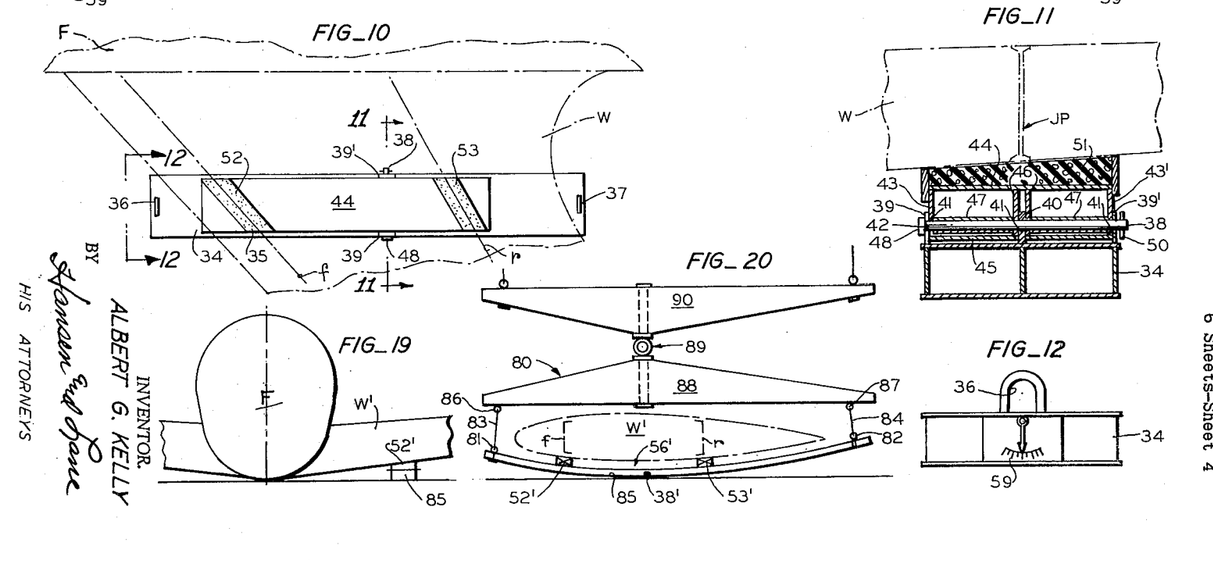
FIG. 10 is a fragmentary plan view of FIG. 9 at reduced scale.
FIG. 11 is a sectional detail through FIG. 10 taken along line 11—11 thereof.
FIG. 12 is an end view of the lifting beam of FIG. 10 as seen from line 12—12 thereof.
FIG. 19 is a fragmentary view similar to that of FIG. 6 but illustrating another procedure of initial lifting.
FIG. 20 is a modified form of pivot beam lifting under the condition shown in FIG. 19.

The pivotal connection 38 between the two beams 34 and 35 is illustrated in perspective in FIG. 13 and in cross section in FIG. 11. The pivotal connection 38 includes a pair of outer pivot mounts 39–39' and a middle pivot mount 40. These pivot mounts 39, 39' and 40 are triangular shaped metal ears having their base edges secured, as by welding, to the top surface of the box girder lifting beam 34. Each ear has a bore 41 and all bores 41 are aligned to receive a pivot pin 42.

Figure 9:
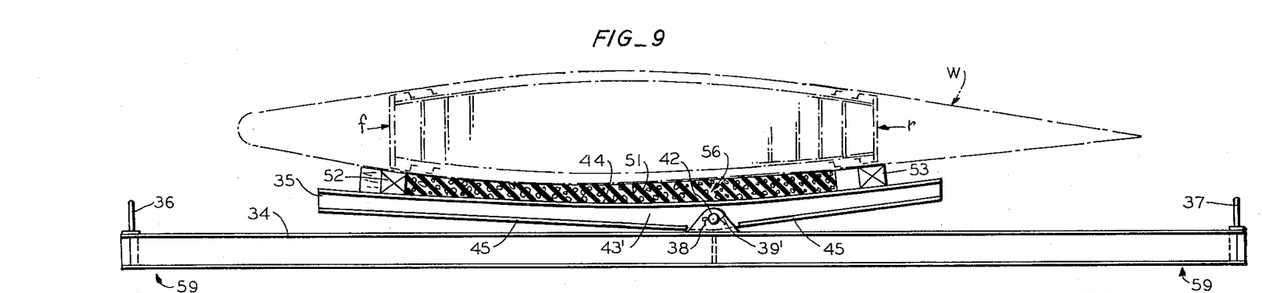
FIG. 9 is an enlarged side elevation of the wing supporting lift beam of FIG. 8.

The pivoted beam 35 is likewise a box girder built up of structural steel. The side panels 43–43' of the beam 35 are deepest at the zone of pivotal connection 38. The beam 35 has an upper plate 44 providing a surface of curved contour such as to lie substantially parallel to and to conform to the curved contour of the underside of the wing W of an aircraft to be supported. The bottom of the pivoted beam 35 is a flat plate 45 diverging upwardly from the zone of pivotal connection 38 by reason of the tapering side panels 43–43' as best illustrated in FIG. 9. Midway between the side panels 43–43' is a pair of spaced plates 46 which straddle the middle pivot mount 40 on the lifting beam 34. The side panels 43–43' and the spaced plates 46 are provided with aligned bores 41' each of a diameter comparable to that of the bores 41 of the several pivot mounts. Tubular bearing sleeves 47 span between the side panels 43–43' and their adjacent spaced plate 46 to provide a solid journal for the pivot pin 42. The sleeves 47 have their ends secured, as by welding, to the respective side panels and plates to rigidify them at pivotal connection 38. The arrangement is such that the pivoted beam 35 fits between the outer pivot mounts 39–39' and the spaced plates 46 on pivot beams 35 receive the middle pivot mount 40 on the lifting beam 34. When the bores 41–41' and sleeves 47 are disposed in alignment, the pivot pin 42 is inserted to complete the pivotal connection 38 between the lifting and pivoted beams 34–35.

As best seen in FIGS. 11 and 13 the pivot pin 42 is readily removable, it having an enlarged head 48 at one end adapted to engage one outer pivot mount. The opposite end of pin 42 has a diametric bore 49 disposed to receive a cotter pin 50 adjacent the opposite outer pivot mount. The pivoted beam 35 is thereby secured to the lifting beam 34 but readily rockable relative thereto to compensate for any deviation in disposition of a wing structure relative to the lifting beam 34.

True conformance of the curved upper surface 44 of the pivoted beam to the under surface of the wing W is provided by a cushion of polyurethane foam 51. Referring to FIGS. 9 and 10 it will be noted that each wing W has a front and a rear structural spar $f$ and $r$ which extend somewhat parallel to the fore and aft edges of the wing and are structurally united to the fuselage F of the aircraft. These structural spars $f$ and $r$ are so located that in each particular design of craft their position is known although they are concealed within the metallic skin or outer covering of the wings.

In accordance with the foregoing wing specifications of the particular aircraft to be handled a pair of wooden chocks or blocks 52–53 are placed diagonally upon the respective ends of the pivoted beam 35 as close as possible to alignment with the structural spars $f$ and $r$. These blocks 52–53 are cut and shaped to fit the airfoil contour of the under side of the wing relative to the surfaces of the upper plate 44 of the pivoted beam 35. To assure a skin tight fit to the airfoil surface of the wing the blocks 52–53 are buttered with plastic material such as plaster of Paris which is still pliable as the lifting beam raises the pivoted beam 35 into engagement with the underside of the wing W. Thus the blocks fit firmly and uniformly against the skin layer of the wing engaged thereby. Lifting stress is now exerted against the wing to cause initial deflection in the pivot beams prior to introduction of the foam cushion 51 now to be explained.

Side dams of plywood 54–55 are secured to the ends of the chock blocks 52–53 and the side panels 43–43' of the pivoted beam 35. The space between the chock blocks, plywood dams, the upper plate of the pivoted beam as well as the underside of the wing engaged, is now a chamber 56. The various walls of this chamber 56 are sealed together by masking tape to assure against leakage during introduction of the polyurethane foam into chamber 56. This chamber is filled with the ingredients of polyurethane foam in powdered form and with a solution in such proportion that the latter will develop into foam and fill up the chamber 56.

In order to protect the under surface of the wing from any possible damage from the chemical action of the polyurethane foam during its development, the surface of the wing may be covered with suitable masking tape or other coating impervious to such action.

The polyurethane foam 51 has the characteristic to set up in ten minutes to a consistency capable of carrying ten pounds per square inch. When fully cured, say at the end of an hour, the foam 51 has the capacity of carrying a load of at least twenty-five (25) pounds per square inch.

By this arrangement the load at each wing W is first transferred from the front and rear structural spars f and r to the ends of the pivot beam 34 via the chock blocks 52–53 and thence through the pivotal connection 38 to the lifting beam 34. It should here be noted that as the beam 34 is lifted, the load of the wing is transmitted via the chock blocks to the pivot beam 35 and the latter is deflected, i.e., tends to flatten out. Thereafter the cushion-like body of polyurethane foam is introduced into the chambers 56 and upon setting affords friction bearing against the intermediate area of the wing. In this manner each wing is frictionally stabilized relative to each pivot beam and firmly and securely supported in the region of its jack point jp and areas in proximity thereof.

Figure 1:
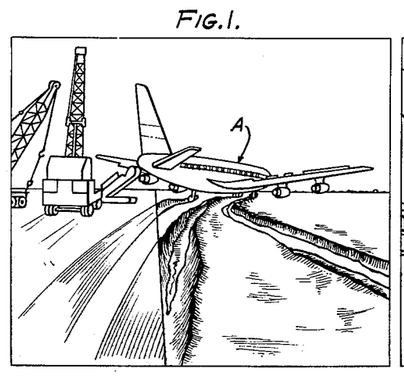
FIG. 1 is a perspective view illustrating a disabled jet type aircraft restricting the use of a runway.
Figure 2:
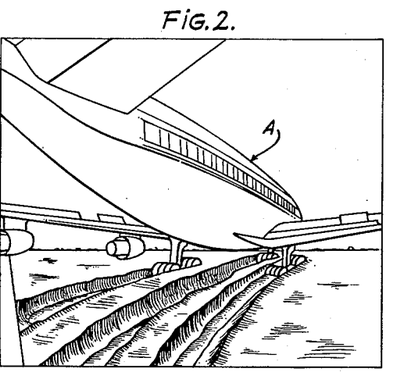
FIG. 2 is an enlarged view of a portion of FIG. 1.
Figure 3:
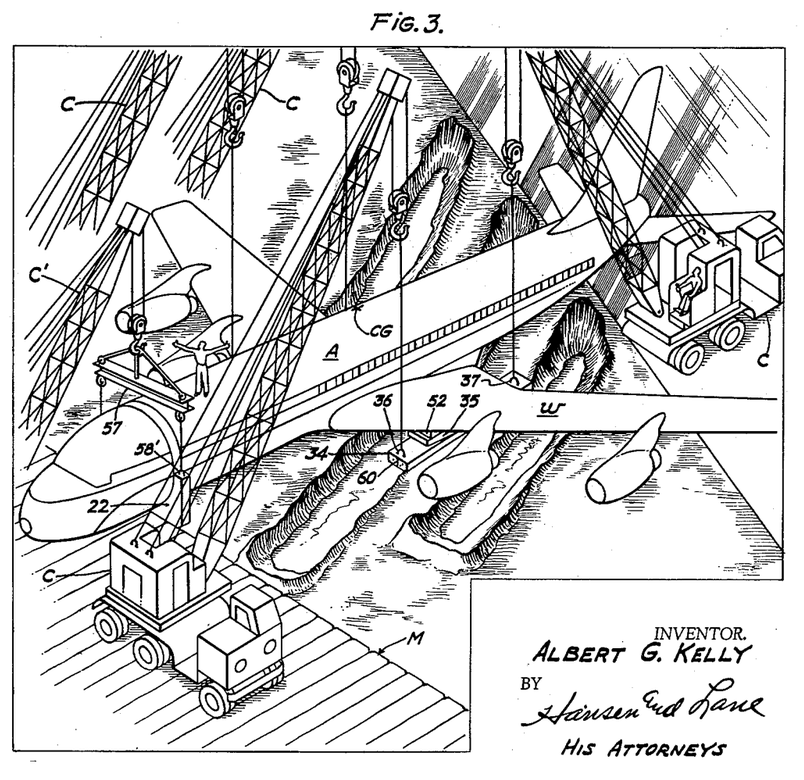
FIG. 3 is a perspective view of the situation of FIGS. 1 and 2 from another angle illustrating the initial step in the recovery procedure of the present invention.
Figure 5:
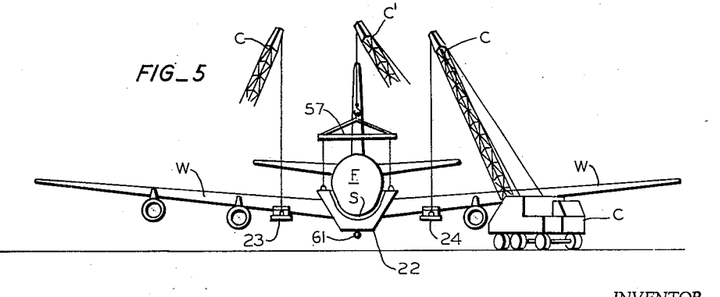
FIG. 5 is a front view of FIG. 4.

In most instances where ground conditions and the like permit, the initial lifting of the aircraft A is best accomplished by means of five cranes, four C of 30 ton capacity each and one C' of 25 ton capacity. As illustrated in FIGS. 3, 4 and 5 these cranes may be rubber tired truck cranes for land operations. In muddy or swamp areas barges and the like may be used. Where the aircraft to be recovered is in water, marine type derricks can be used. Equipment of this type is usually available in or near most principal cities and it many major airports. While equipment of this type is being brought to the site of the accident and while the recovery crew of men is being assembled, the damaged aircraft is defueled in accordance with safety regulations required by the Civil Aeronautics Administration and cleared by the Federal Aeronautics Administration. Defueling of a jet type plane may take several hours depending upon the quantity of fuel on board.

The four heavy cranes C are brought into position quadrantally of the center of gravity C.G. of the aircraft as shown in FIGS. 3, 4 and 5. The top of the derrick booms of the four cranes are positioned one above each of the U bolt eyes 36–37 of both wing supporting means 23 and 24. The cable of the cranes, when suspended from the tops of the derricks serve as plumb bobs for positioning the cranes. The cables of the four cranes are then attached to the U bolt eyes of the wing supporting means 23 and 24.

The fifth or lighter crane C' is brought into position with its derrick top directly above the jack point of the fuselage. The cable of this crane is attached by way of a T beam 57 to the U bolt eyes 58 and 58' of the yoke 22. The yoke 22 is brought into position under the fuselage jack point as illustrated in FIGS. 3 and 5. Suitable cushioning material S such as sponge rubber or the like is placed between the yoke and the skin of the fuselage to protect the latter from being marred or distorted.

As illustrated in FIG. 3 a guideman stands on top of the main body F of the fuselage in full view of all of the men operating the five cranes. The guideman directs the crane operators in the course of lifting the aircraft. Every attempt is made to maintain the damaged aircraft level during the lifting operation, there being a concerted action by all crane operators as directed by the guideman. In this connection it will be noted in FIGS. 9 and 12 that the several lifting beams 34 are provided with level indicators 59 at the sides as well as the ends of the beams. In the present disclosure there is shown a pivoted pointer operatively associated with a weight or weighted such as to plumb or hang down vertically relative to indicia on the fore or aft face of each lifting beam 34. By this means substantial accuracy of level can be attained.

Once the damaged aircraft A is completely suspended by the five cranes the latter can be manuevered to turn the aircraft into a position in which it is facing nose end forward into the prevailing wind. If the terrain is all cut up and rutted, matting M may be placed as shown in FIG. 3 to maintain the cranes on level surface. If the terrain to too badly cut up and rutted turning of the aircraft into the wind may be delayed until mobile carriers (FIGS. 16, 17 and 18) can be placed under the suspended aircraft for more secure movement on the A-frame 21 in accordance with this invention.

Figures 16, 17, 18:
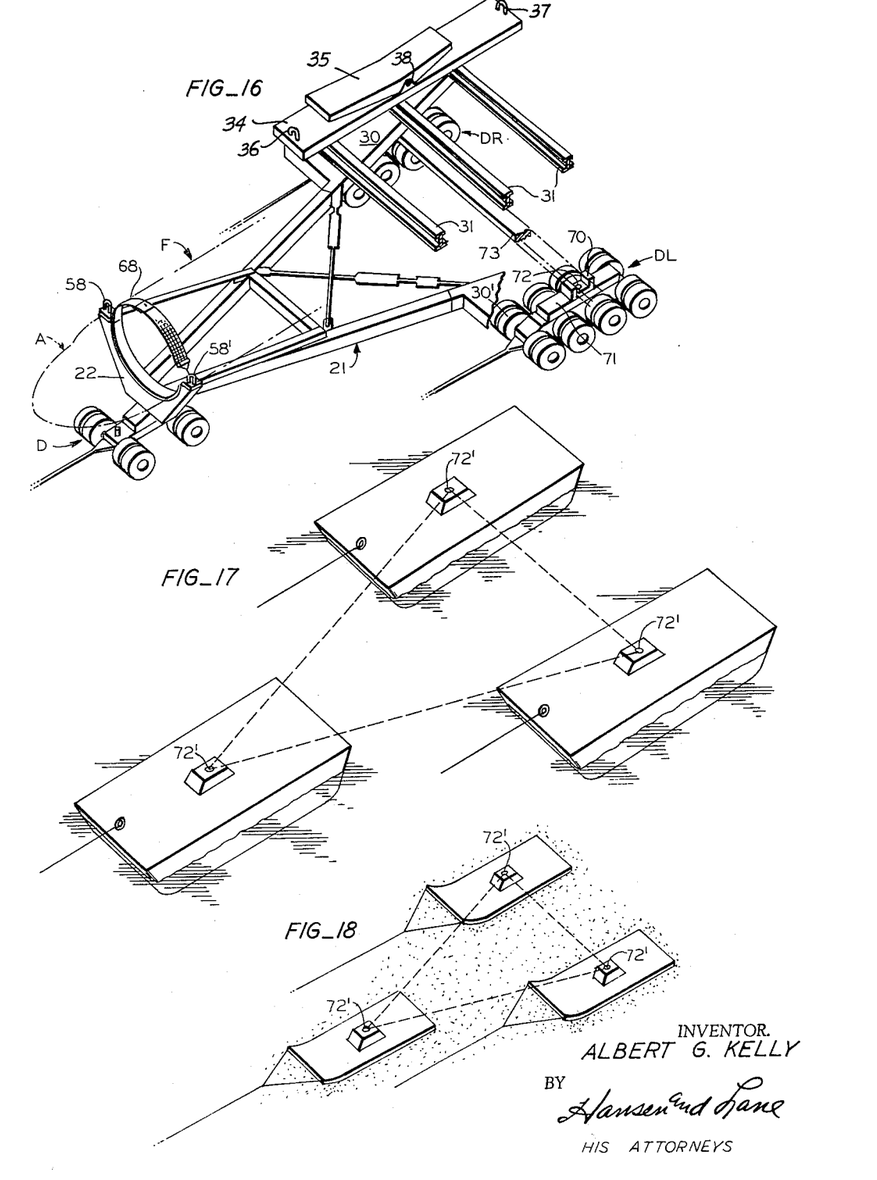
FIG. 16 is a perspective view, partially broken away illustrating wheeled mobility of the removal apparatus.
FIG. 17 is a perspective view showing float, barge and buoyant means for conveying the removal apparatus on water.
FIG. 18 is a perspective view showing skid or ski type mobile means for conveying the removal apparatus over ice and snow.

Referring now to FIG. 16 the A frame 21 is shown juxtaposed relative to the right wing supporting means 23, the yoke 22 and one type of mobile carrier in the form of dollies D.

Figure 6:
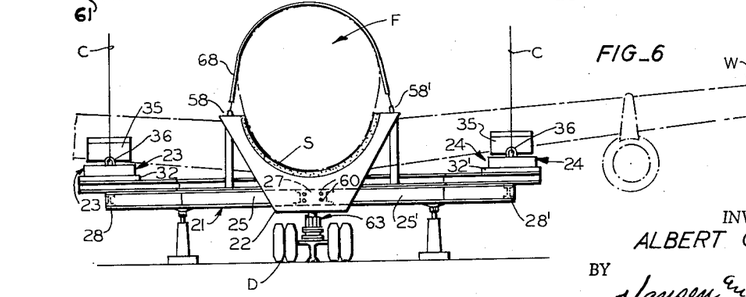
FIG. 6 is a fragmentary enlargement of a portion of FIG. 5 showing the aircraft removal apparatus.

The triangular shaped A frame 21 is assembled on the site of the accident, as previously explained, with the platform 30–30' at its base end disposed beneath the wing supporting members 23 and 24, respectively. The aft end of the A frame 21 is temporarily supported on jack screws or the like during bolting of the A frame to the lifting beams. The A frame is positioned so its box-like apex end 27 can be secured by bolts or pins 60 to the yoke 22, as shown in FIGS. 6 and 14.

The yoke 22 is provided with a ball appendage 61 at its lower end, vertically below the axis of the yoke and craft supported therein. The ball 61 is adapted to be confined in a ball seat 62 formed in a pedestal 63 which in turn is mounted on a mobile carrier such as the forward or lead dolly D. The ball 61 is secured into the ball seat 62 by a cover 64 made up of quarter sections 65 bolted as at 66 to quadrantal flanges 67 formed as a part of the pedestal 63.

The fore-end of the fuselage F is secured into the yoke 22 by means of a strap 68 having its hook ends connected to the U bolt eyes 58 and 58', the strap being cinched up by a suitable buckle to maintain the yoke and fuselage secured.

Once the A frame is secured, and the left and right lifting beams 23 and 24 are resting on it the jack screws (FIG. 6) or other type blocking can be removed to enable movement of a pair of after dollies DI and DR into position beneath the base ends of the A frame 21. As shown in FIG. 16 the after dollies which are identical each include a saddle 70 mounted on dolly frame 71. The saddle 70 has a vertical pin 72 extending downwardly therefrom journaled in a sleeve bore 72' to afford turning of the after dollies relative to the saddle 70. The ends of a wooden timber or "talking beam" 73 rest on the saddles 70 of the two after dollies. This beam 73 is disposed parallel to the base end of the triangular A frame 21 to receive and support the aft ends of the platforms 30–31' as the craft is lowered by the after cranes C. The talking beam 73 and its relation to the cross beams 31 indicates shifting of the loads on the two after dollies DL and DR during mobile movement thereof.

The entire aircraft A is now supported on the removal apparatus 20 connected to the three mobile carriers 19 which in FIG. 16 are in the form of wheeled dollies D, DL and DR. In the event the terrain is muddy or rutted, any one of the dollies can have been placed on matting M as illustrated in FIG. 3. If the damaged aircraft has not already been turned to face into the prevailing wind, the dollies can be pulled, by tractors, to so turn the craft into the wind. In such condition the damaged craft can be transported as a unit with the removal apparatus in any direction, compasswise, with the craft always facing windward to thus avoid its tipping due to side thrusts of the wind.

It should here be noted that should any one or more of the dollies be tilted or rocked relative to level, such differences of disposition will not be transferred to the load due to the ball and socket connection at the yoke 22 and the rockability of the pivoted beams 35 relative to their lifting beams 34 which are resting on the A frame 21. By this arrangement the damaged craft is subjected to no racking, twisting or crushing stresses. Neither is the skin or outer thin layer of metal on the wings and fuselage subjected to any undue pressures or distortion. Consequently there is no, or at least a minimum of secondary damage to the craft. The entire damaged craft is thereby moved to the nearest level surface or runway for movement thereover to a hanger or a repair base.

Recovery or salvage of a damaged craft from deep water would be accomplished in the same manner as explained above using marine derricks in place of the truck type cranes and pontoons and/or barges 75 instead of the dollies as illustrated in FIG. 17. In the event the crash occurred while the ground is covered with snow, ice or the like, skids, sleds or like sliding mobile units 76 would be employed as illustrated in FIG. 18. Under any ground condition, swampland or bodies of water the same recovery apparatus 20 is employed to hold the damaged craft firmly on three points contiguous to the three jack points of the craft itself to assure against any secondary damage thereto during recovery and removal to a place of repair.

Referring to FIGS. 19 and 20 in which a disabled aircraft is illustrated as "belly landed" or resting upon a surface without support of landing gear. In such condition it may be more convenient to employ a modified form pivot beam support for each wing. Such modified form of articulatable lifting means is illustrated at 80 in FIG. 20. In this form 80 the so called "rocking beam" 85 is lengthened as compared to the one 35 previously explained. The beam 85 is lengthened to extend beyond the fore and aft edges of the wing W' to permit connection of lifting eyes 81 and 82 to linkage 83 and 84 from above.

In this form of wing support the beam 85 has a curvature conforming somewhat to the under contour of the wing and is provided with pivot connection 38' for later connection to a lifting beam. Wooden chocks or blocks 52'-53' are placed beneath the fore and aft structural spars $f$ and $r$ of the wing in the same manner as illustrated in FIGS. 9 and 10.

The linkages 83 and 84 are connected to eyes 86 and 87 provided on an overhead beam 88 suspended on a medial swivel connection 89 from a lifting beam 90 which in turn has its ends connected to the cables of fore and aft cranes C such as those shown in FIGS. 4 and 5. The cables of these cranes are lowered uniformly to lower the lifting beam 90 and the overhead beam swively connected thereto into a position above the jack point of the wing W'. The linkages 83 and 84 are then connected between the beams 88 and 85 and the cables of the fore and aft cranes drawn up. The load of the wings W' are now transmitted from the fore and aft spars $f$ and $r$ through the chock blocks 52' and 53' to the beam 85 which will now adjust under initial deflection to the load. Thereafter the polyurethane foam 51 is introduced into a chamber 56' similarly provided as in FIGS. 9 and 11 to afford friction connection between the wings and the beams 85 as previously explained. By this arrangement leveling of the aircraft according to its own center of gravity is assured as before until the suspended craft can be placed upon an A frame and carrier for movement.

Having thus described my new method and means for recovering damaged aircraft it will be appreciated that the same is susceptible to variations, alterations and/or modifications without departing from the spirit of my invention therein. I therefore desire to avail myself of all variations, alterations and/or modifications as fairly come within the purview of the appended claims.

What I claim as new and desire to protect by Letters Patent is:

1. In apparatus for removing a disabled aircraft of the type having a jack point structurally connected to the fore and aft spars of its wing construction, a wing supporting means for each wing of such aircraft, each said wing supporting means comprising a pivot beam disposed beneath and transverse to each said wing in the region of the jack point therein, said pivot beams having a contour conforming substantially to that of the underside of said wings, a pair of chock blocks supported on each said pivot beams one below each structural fore and aft spar of each such wing, a lifting beam parallel to and below each said pivot beam, means for pivotally connecting each said pivot beam to its respective lifting beam for rocking movement about axes transverse to the longitudinal axis of such aircraft, means for lifting each lifting beam from the ends thereof for initially deflecting the pivot beam connected thereto, and a foam cushion between said chock blocks and between the underside of said wings and the upper surface of said pivot beam for frictionally stabilizing the wings relative to the respective pivot beam therebelow.

2. In an apparatus for removing a disabled aircraft from an airstrip and the like, wing supporting means comprising lifting beams adapted to be disposed one below each wing of such aircraft in the region of the jack points therein and to extend beyond the fore and aft edges of said wings for suspension by separate crane operated cables connected one to each end of each of said lifting beams, a pivot beam pivotally connected to said lifting beam for rocking movement about an axis transverse to the latter, said pivot beam having its upper surface contoured to conform substantially with that of the underside of said wing, chock blocks on said pivot beam aligned with the fore and aft structural spars within said wing and surface contoured to fit snugly against the skin layer thereof engaged by such blocks, dam walls between each end of said chock blocks, the upper surface of said pivot beam and the under surface of said wing to form a cushion receiving chamber, and a foam cushion within said chamber for frictionally engaging the skin layer of the wing exposed to such chamber.

3. In apparatus for moving disabled aircraft, wing supporting means comprising pivot beams adapted to be disposed one below each wing in the region of the jack point therein, each said pivot beam having a contour conforming substantially to that of the underside of the wing, a chock block at each end of said pivot beam shaped to the contour of the wing and in substantial alignment with the fore and after structural spars of the wing, a plastic material applied to each of said chock blocks for fitting the latter firmly and uniformly against the skin layer of the wings, a dam wall between each end of said blocks, the sides of said pivot beam and the underside of said wing for providing a chamber therebetween, a lifting beam pivotally connected to each of said pivot beams and extending beyond the fore and aft edges of said wings for suspension from depending cables of derrick-cranes whereby when said lifting beams are lifted the load of each wing is transmitted via the chock blocks to the pivot beams for initially deflecting the said pivot beams, and a polyurethane foam introduced into the chamber provided on each said pivot beam for frictionally stabilizing the wing above relative thereto.

4. Apparatus for moving disabled aircraft comprising pivot beams adapted to be disposed one below each wing in the region of the jack point therein, each said pivot beam having a contour conforming substantially to that of the underside of the wing, a chock block at each end of said pivot beam shaped to the contour of the wing and in substantial alignment with the fore and aft structural spars of the wing, a plastic material applied to each of said chock blocks for fitting the latter firmly and uniformly against the skin layer of the wings, a dam wall between each end of said blocks, the sides of said pivot beam and the underside of said wing for providing a chamber therebetween, a lifting beam pivotally connected to each of said pivot beams and extending beyond the fore and aft edges of said wings for suspension from depending cables of derrick-cranes whereby when said lifting beams are lifted the load of each wing is transmitted via the chock blocks to the pivot beams for initially deflecting the said pivot beams, and a polyurethane foam introduced into the chamber provided on each said pivot beam for frictionally stabilizing the wing above relative thereto, a yoke for receiving the fuselage in the region of the jack point therein, said yoke having means thereon for suspending the same from a depending cable of a derrick-crane whereby the fuselage can be lifted in unison with said lifting beams, an A frame for tying said yoke and said lifting beams together in fixed relation relative to the respective jack points of said aircraft, and a separate mobile carrier below each lifting beam and said yoke each turnable about a turntable substantially co-inciding with the jack point above it.

5. Apparatus for moving disabled aircraft comprising pivot beams adapted to be disposed one below each wing in the region of the jack point therein, each said pivot beam having a contour conforming substantially to that of the underside of the wing, a chock block at each end of said pivot beam shaped to the contour of the wing and in substantial alignment with the fore and aft structural spars of the wing, a plastic material applied to each of said chock blocks for fitting the latter firmly and uniformly against the skin layer of the wings, a dam wall between each end of said blocks, the sides of said pivot beam and the underside of said wing for providing a chamber therebetween, a lifting beam pivotally connected to each of said pivot beam and extending beyond the fore and aft edges of said wings for suspension from depending cables of derrick-cranes whereby when said lifting beams are lifted the load of each wing is transmitted via the chock blocks to the pivot beams for initially deflecting the said pivot beams, and a polyurethane foam introduced into the chamber provided on each said pivot beam for frictionally stabilizing the wing above relative thereto, a yoke for receiving the fuselage in the region of the jack point therein, said yoke having means thereon for suspending the same from a depending cable of a derrick-crane whereby the fuselage can be lifted in unison with said lifting beams, an A frame for securing said yoke and said lifting beams together in a triangle fixed relative to the respective jack points of said aircraft, a separate mobile carrier below each lifting eam turnable about a turntable substantially co-inciding with the jack point in the wing above, a mobile carrier below said yoke, and a ball and socket connection between said yoke and the mobile carrier below it affording universal turnability between the latter and said yoke.

6. Apparatus for removing from an airstrip or the like a disabled aircraft having jack points in its framework comprising a triangular shaped A frame having platforms at its base angles adapted to be disposed beneath the jack points in the respective wings of said aircraft and a yoke at the apex end of said A frame for receiving and supporting the fuselage of said aircraft in the region of the jack point in the said fuselage, a plurality of cross-beams supported on said platforms parallel to the base side of said triangular A frame, a lifting beam supported on said cross beams, one above each platform supporting the same, a pivot beam for engaging each wing of said aircraft each pivot beam having its upper surface contoured to engage the underside of the wing to be engaged thereby in the region of the jack point therein, means for pivotally connecting each of said pivot beams to its respective lifting beam, a mobile carrier having ball and socket connection with said yoke for supporting the same for maneuverability in any angular direction relative thereto, and left and right mobile carriers, adapted to be disposed one beneath each of said platforms, and a talking beam having its ends pivotally supported on said left and right mobile carriers for receiving and supporting the base end of said A frame and for indicating misalignment of said talking beam relative to the cross beams above by shifting of the left and right mobile carriers relative to said A frame.

7. Apparatus for removing from an airstrip or the like a disabled aircraft having jack points in its framework comprising an A frame having a pair of platforms adapted to be disposed one beneath the jack point in a respective wing of said aircraft and a yoke adapted to be secured to said A frame in the region of the jack point in the fuselage of said aircraft for receiving and supporting the fuselage thereof, a plurality of cross beams having their ends supported on said platforms, a lifting beam supported adjacent each end of said cross beams and above the platform supporting the same, a pivot beam pivotally connected to each of said lifting beams for rocking movement about an axis parallel to said cross beams, each pivot beam having its upper surface contoured to engage the underside of a respective wing of such aircraft in the region of the jack point therein, a medial mobile carrier having ball and socket connection with said yoke for supporting the same for turnability in any angular direction, and a pair of side mobile carriers each having a saddle connected thereto on a vertical pin, a talking beam having each of its ends supported in a saddle of a respective one of said side mobile carriers for spanning between the same in parallelism with the cross beams supported on said platforms and for receiving the latter to support the same during transit, said talking beam when out of parallelism with said cross beams indicating a shifting of the side mobile carriers relative to the load.

8. Apparatus for removing from an airstrip or the like a disabled aircraft of the type having jack points in its framework comprising a separate lifting beam adapted to be disposed below each wing in the region of the jack point therein and to extend parallel to the fuselage of such craft and beyond the fore and aft edges of said wings for suspension by separate crane operated cables connected to each end of said lifting beam, a pivot beam pivotally connected to each of said lifting beams for rocking movement about an axes transverse to the latter, each of said pivot beams having its upper surface contoured for substantially spaced parallel relation with respect to that of the underside of the wing to be engaged thereby, chock blocks on each of said pivot beams aligned with the fore and aft structural spars within the wing to be engaged thereby and surface contoured to fit snugly against the skin layer thereof to be engaged by such blocks, means for closing the space between each of said chock blocks and the upper surface of said pivot beams and the under surface of the wing above the latter to form a cushion receiving chamber, a foam cushion created on site within said chamber for frictionally engaging the skin layer of the wing exposed to such chamber, a fuselage receiving and supporting yoke secured to the fuselage of such craft in the region of a jack point therein, means for suspending said yoke from a separate single cable of a derrick-crane whereby to lift said fuselage in unison with each wing upon operation of all of such crane cables, an A frame of triangular shape having a platform adjacent each base angle thereof, a plurality of timbers supported on an extending between said platforms in parallel relation to the base side of said triangular frame for receiving and supporting both of said lifting beams when the latter are lowered onto the A frame, and means for securing said yoke to the apex and end of said A frame.

9. Apparatus for removing from an airstrip or the like a disabled aircraft of the type having jack points in each wing and the fuselage comprising a separate lifting beam adapted to be disposed below each wing in the region of the jack point therein and to extend parallel to the fuselage of such craft and beyond the fore and aft edges of said wings for suspension by separate crane operated cables connected to each end of said lifting beam, a pivot beam pivotally connected to said lifting beam for rocking movement about an axis transverse to the latter, said pivot beam having its upper surface contoured for spaced substantially parallel relation with respect to the contour of the underside of the wing to be engaged thereby, chock blocks supported adjacent each end of said pivot beam in substantial alignment with the fore and aft structural spars within the wing and surface contoured to fit snugly against the skin layer thereof to be engaged by such blocks, means for closing the space between each of said chock blocks and the upper surface of said pivot beam and the under surface of said wing above the latter to form a cushion receiving chamber, a polyurethane foam cushion injected into said chamber and adapted upon setting to frictionally engage the skin layer of the wing exposed to such chamber for stabilizing said pivot beam relative to the wing, a cushioned yoke adapted to receive and support the fuselage of such craft in the region of a jack point therein, means for suspending said yoke from a separate single cable of a derrick-crane whereby to lift the fuselage in unison with each wing of such craft upon operation of all of such crane cables, an A frame having platforms adapted to be disposed one below each of said lifting beams, a plurality of timbers supported on and extending between said platforms for receiving and supporting both of said lifting beams when the latter are lowered onto the same, and means for securing said yoke to the apex end of said A frame.

10. Apparatus for removing from an airstrip or the like a disabled aircraft of the type having jack points in each wing and the fuselage comprising a separate lifting beam adapted to be disposed below each wing in the region of the jack point therein and to extend parallel to the fuselage of such craft and beyond the fore and aft edges of said wings for suspension by separate crane operated cables connected to each end of said lifting beam, a pivot beam pivotally connected to said lifting beam for rocking movement above an axis transverse to the latter, said pivot beam having its upper surface contoured for spaced substantially parallel relation with respect to the contour of the underside of the wing to be engaged thereby, chock blocks supported adjacent each end of said pivot beam in substantial alignment with the fore and aft structural spars within the wing and surface contoured to fit snugly against the skin layer thereof to be engaged by such blocks, means for closing the space between each of said chock blocks and the upper surface of said pivot beam and the under surface of said wing above the latter to form a cushion receiving chamber, a polyurethane foam cushion injected into said chamber and adapted upon setting to frictionally engage the skin layer of the wing exposed to such chamber for stabilizing said pivot beam relative to the wing, a cushioned yoke adapted to receive and support the fuselage of such craft in the region of a jack point therein, means for suspending said yoke from a separate single cable of a derrick-crane whereby to lift the fuselage in unison with each wing of such craft upon operation of all of such crane cables, an A frame having platforms adapted to be disposed one below each of said lifting beams, a plurality of timbers supported on and extending between said platforms for receiving and supporting both of said lifting beams when the latter are lowered onto the same, means for securing said yoke to the apex end of said A frame, said yoke having a ball joint on its underside, a central mobile carrier having a socket for receiving the ball joint of said yoke, and a paid of wing carriers each having a turnable saddle thereon, a talking beam having each end thereof supported in the saddle of one of said wing carriers for spanning between said wing carriers in parallel relation to said cross beams and to receive and support the platform zones of said A frame.

References Cited in the file of this patent

UNITED STATES PATENTS

| | | |
|---|---|---|
| 1,740,021 | Junkers | Dec. 17, 1929 |
| 2,240,724 | Stoehr | May 6, 1941 |
| 2,335,692 | Murray | Nov. 30, 1943 |
| 2,391,510 | Pioch | Dec. 25, 1945 |
| 2,413,242 | Murray | Dec. 24, 1946 |
| 2,583,114 | Monteith | Jan. 22, 1952 |
| 2,712,874 | Murray | July 12, 1955 |
| 2,803,360 | Midgley | Aug. 20, 1957 |
| 3,045,839 | Hibberd | July 24, 1962 |

FOREIGN PATENTS

| | | |
|---|---|---|
| 712,608 | France | Oct. 6, 1931 |